H. Skinner.
Weaving Pile Fabric.
N° 39,759.
Patented Sep. 1, 1863.
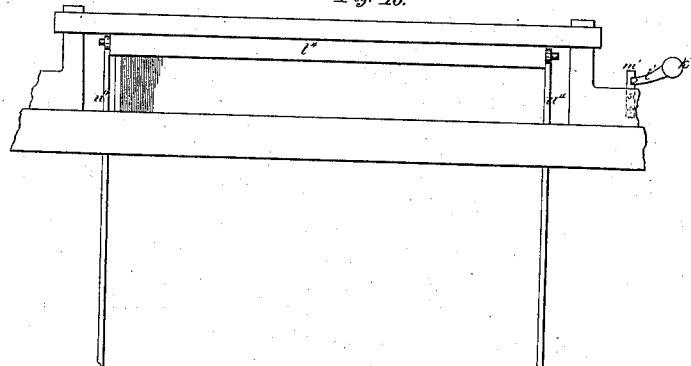
Fig. 10.
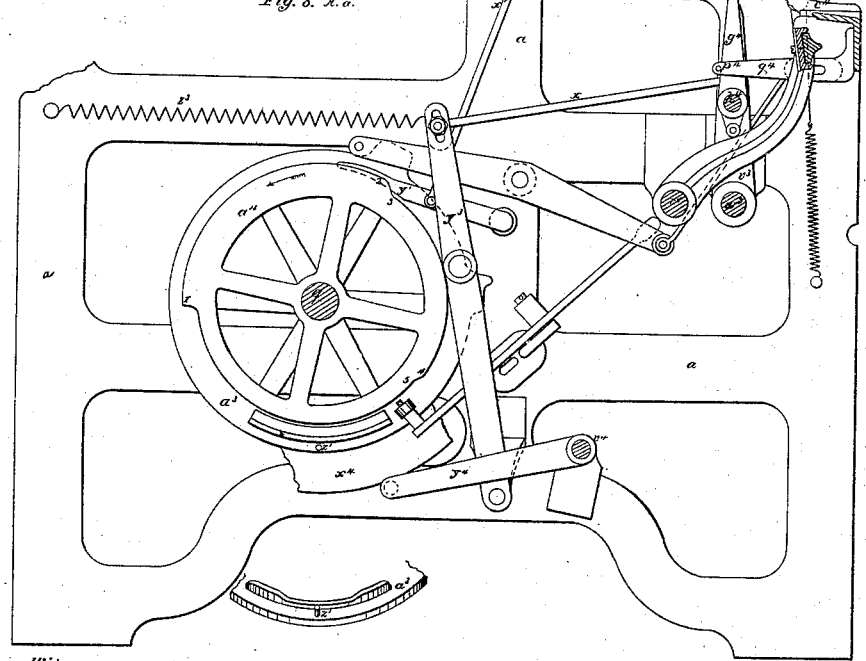
Fig. 8.
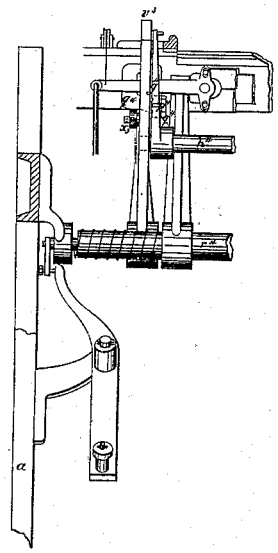
Fig. 9.
Witnesses,
Inventor,
Halcyon Skinner H. Skinner.
Weaving Pile Fabric.

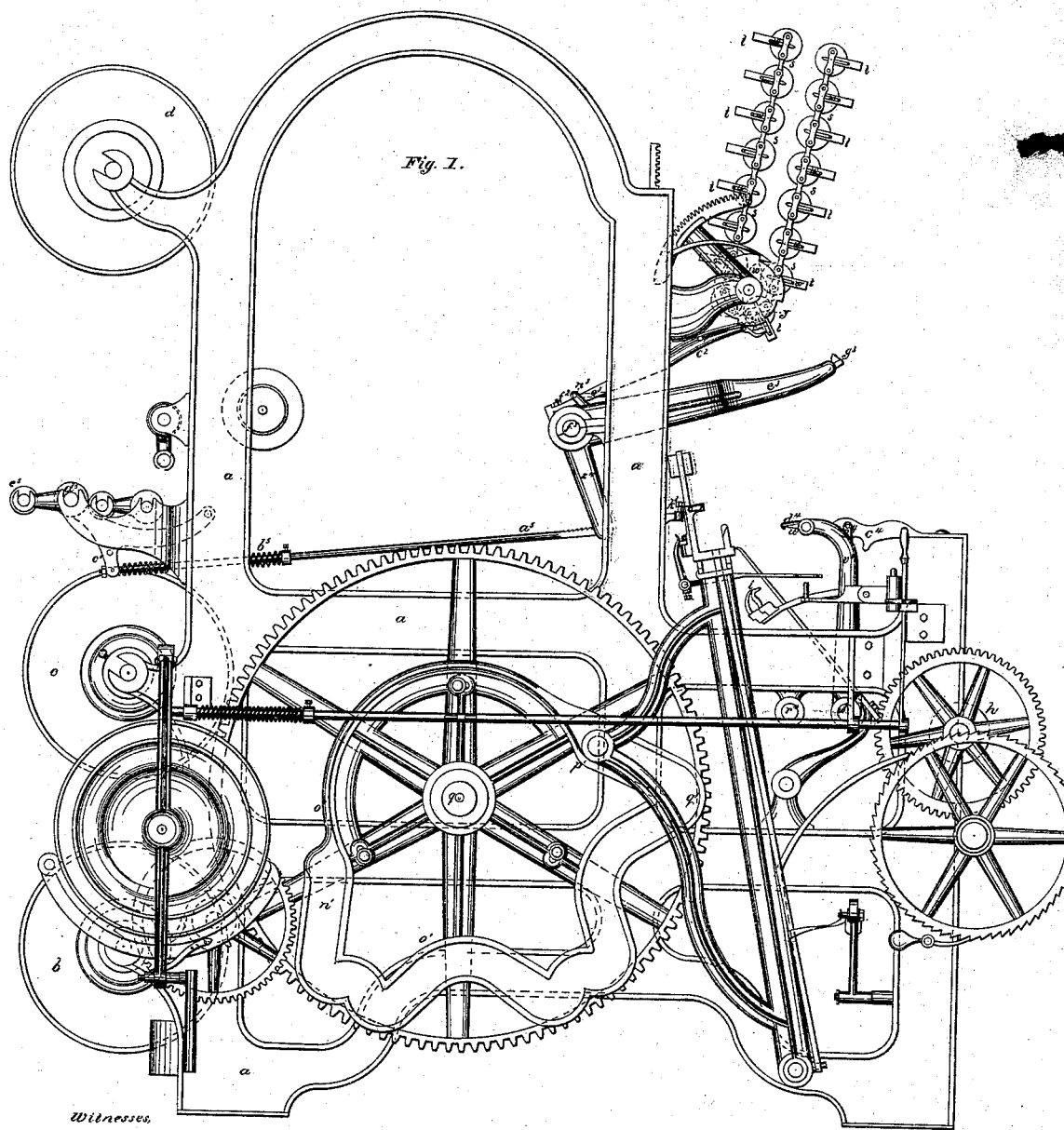

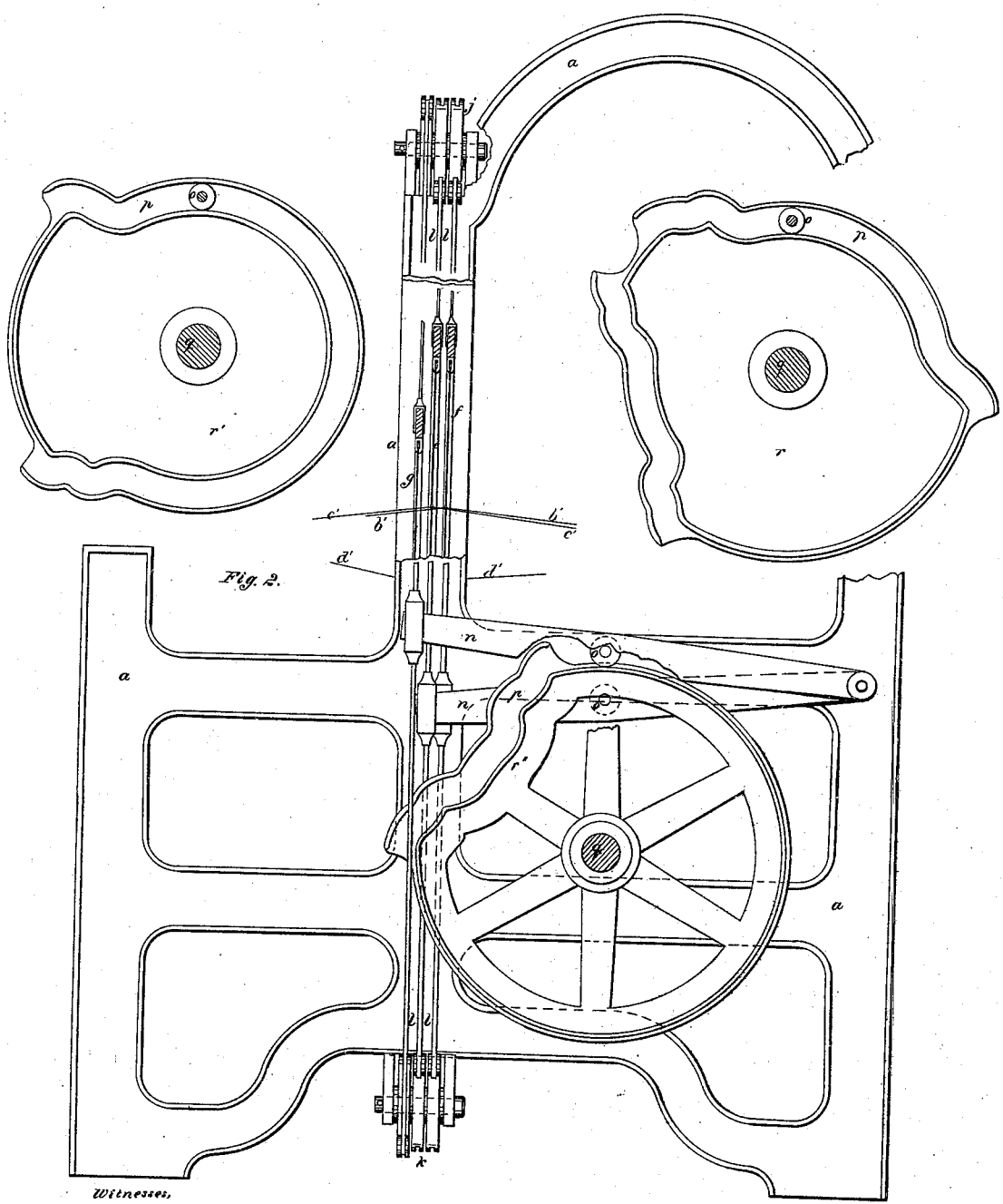

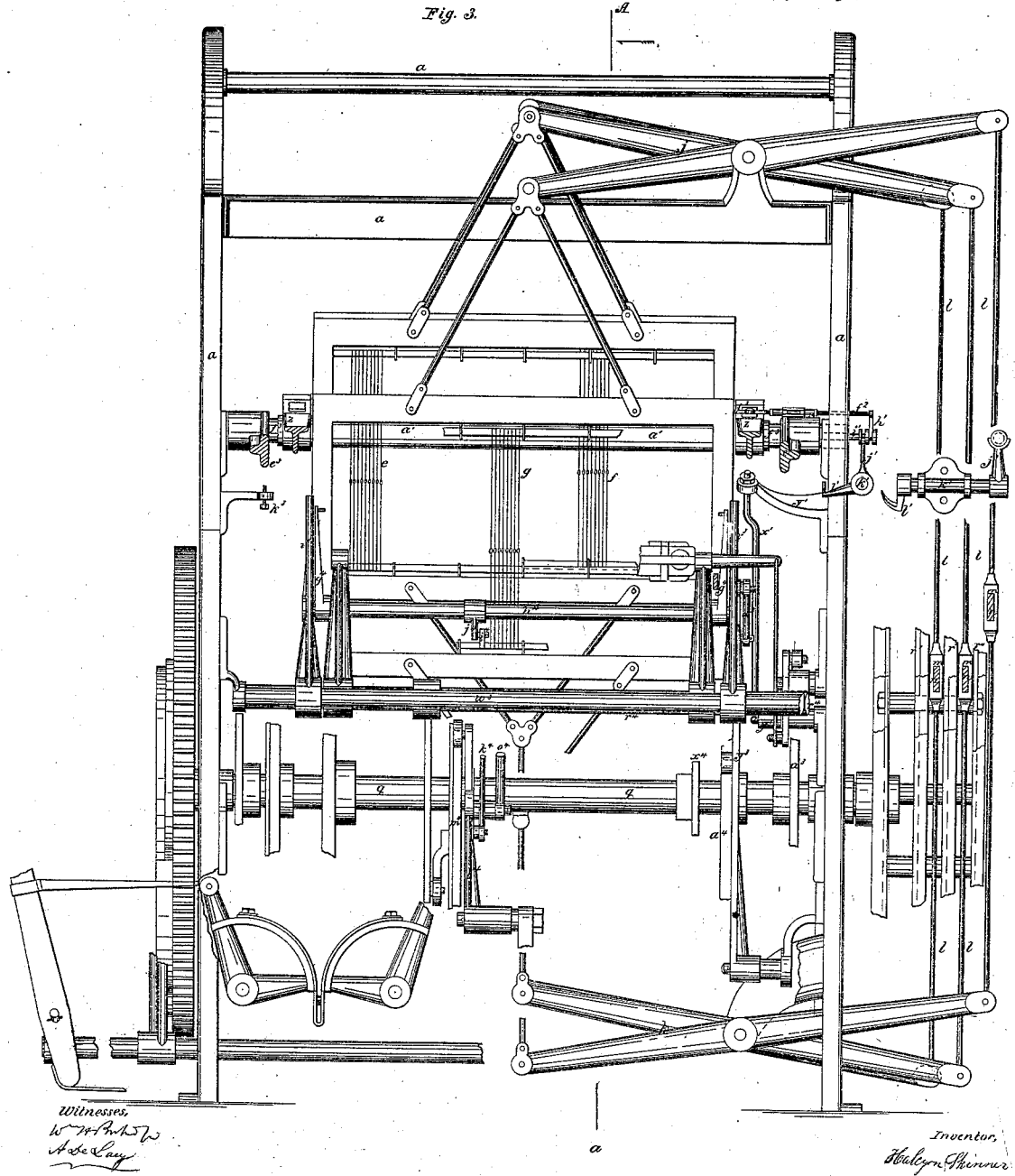

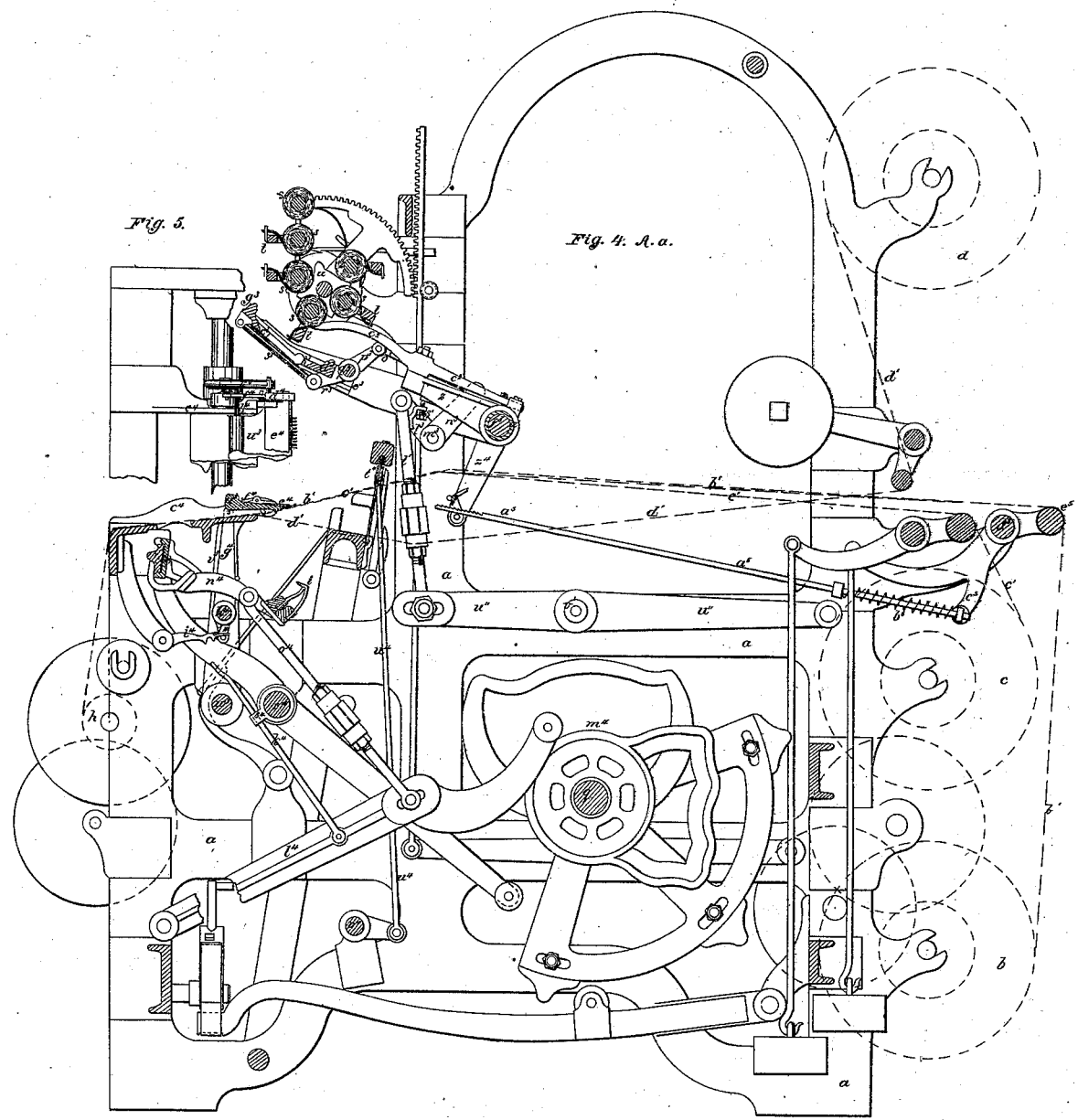

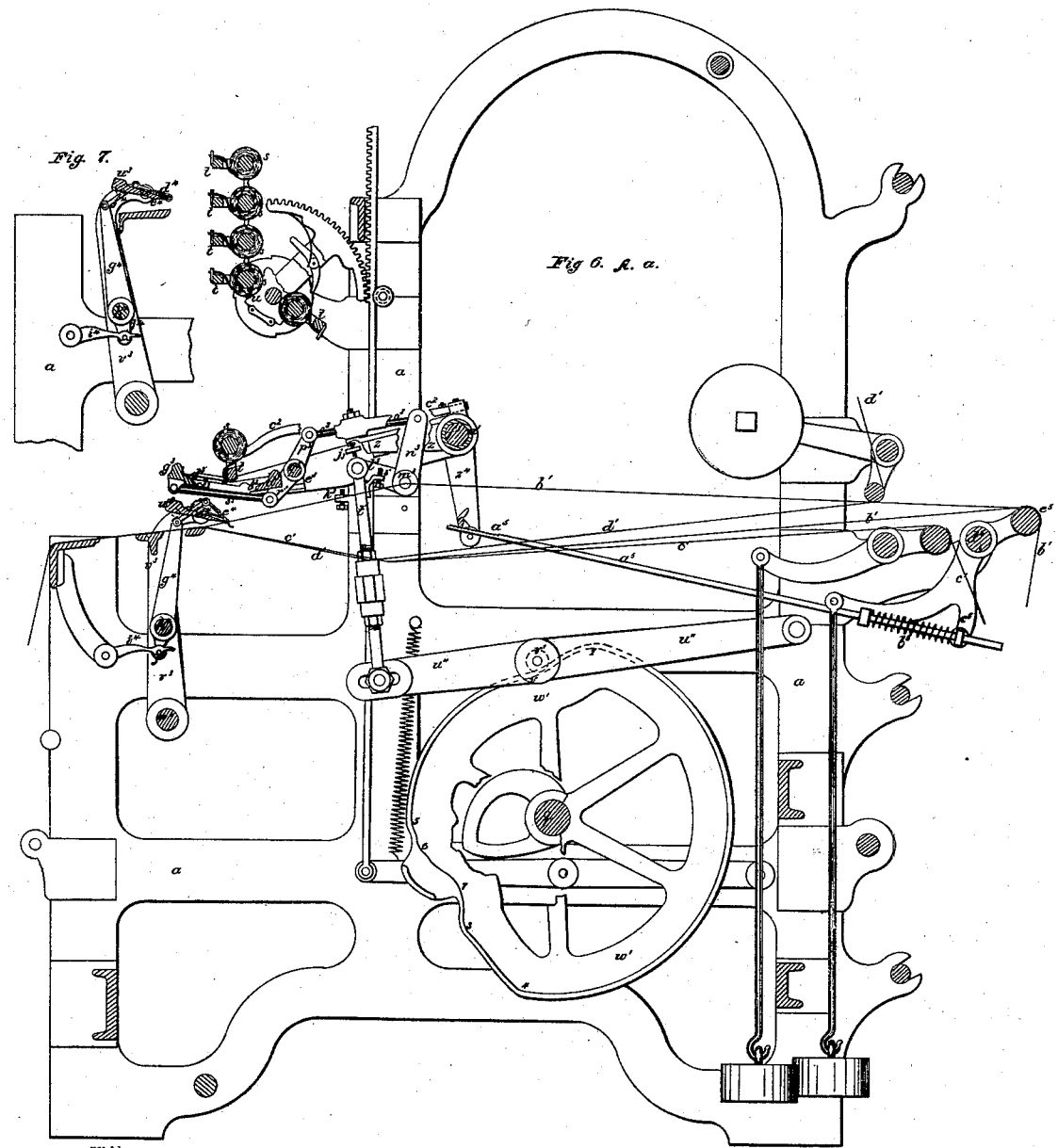

N° 39,759.   Patented Sep. 1, 1863.

Witnesses,
W. H. Bishop
A. De Lacy

Inventor,
Halcyon Skinner

UNITED STATES PATENT OFFICE.

HALCYON SKINNER, OF WEST FARMS, NEW YORK, ASSIGNOR TO ALEXANDER SMITH, OF SAME PLACE.

IMPROVEMENTS IN POWER-LOOM FOR WEAVING TUFTED PILE FABRICS.

Specification forming part of Letters Patent No. 39,759, dated September 1, 1863.

*To all whom it may concern:*

Be it known that I, HALCYON SKINNER, of West Farms, Westchester county, and State of New York, have invented certain new and useful Improvements in the Power-Loom for the Manufacture of Tufted Pile Fabrics; and I do hereby declare that the following is a full, clear, and exact description thereof, reference being had to the accompanying drawings, making part of this specification, in which—

Figure 11:
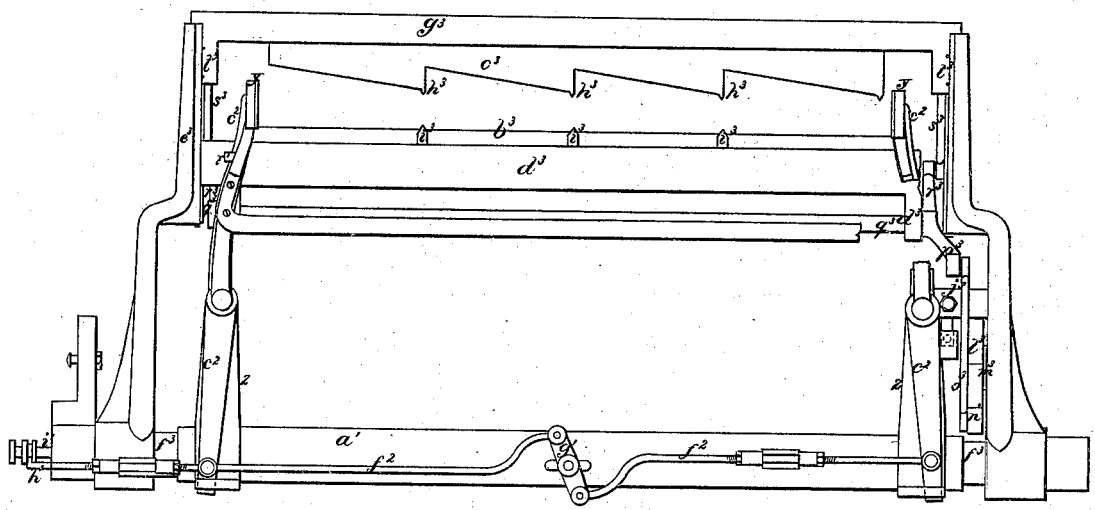
Figure 14:
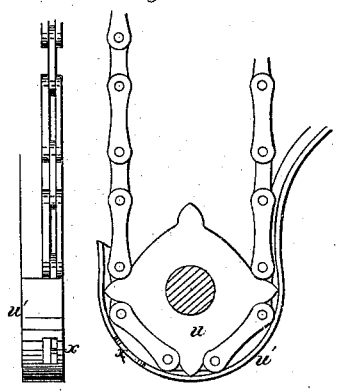
Figures 12, 13:
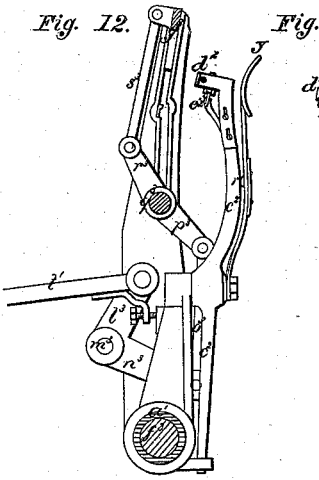
Figure 15:
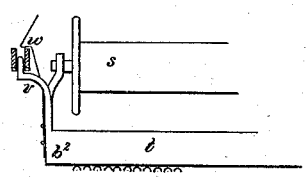

Figure 1 is an elevation of the left-hand side of a loom on my improved plan; Fig. 2, an elevation of the right-hand side, with part of the frame cut away to exhibit the arrangement of the harness; Fig. 3, an elevation of the front with the front portion of the frame removed; Fig. 4, a vertical section taken at the line A a of Fig. 3; Fig. 5, a plan of one end of the combing mechanism and the plate for holding down the tufting-warps; Fig. 6, another vertical section taken at the line A a of Fig. 3, and representing the parts in different positions from Fig. 4; Fig. 7, a like vertical section of the combing mechanism and parts connected therewith represented in a third position; Fig. 8, another vertical section taken at the line A a of Fig. 3, but looking in a direction the reverse of the arrow on Fig. 3; Fig. 9, a section of the mechanism for operating the comb; Fig. 10, a front view of the lay to represent the plate which beats up the ranges of tufts, and part of the mechanism by which it is prevented from chafing the warp-yarns; Fig. 11, a plan of the shears and the mechanism for transferring the spool-frames and part of the mechanism for operating them; Fig. 12, an end view of Fig. 11; Fig. 13, a section in perspective of the mechanism for gripping the spool-frames; Fig. 14, side and edge views in section of one of the spool-chains and parts in connection, and Fig. 15 front and end view of one end of a spool-frame.

The same letters indicate like parts in all the figures.

My said invention relates to improvements upon an invention described in and secured by Letters Patent of the United States, bearing date the 4th day of November, 1856, and granted to Alexander Smith and Halcyon Skinner for a power-loom for weaving a fabric composed of tufts of yarn to form the figuring pile, and held by a linen warp and weft to form a back resembling the back of tapestry Brussels carpeting interwoven with the usual heddles and shuttles, as in weaving tapestry-carpeting, such fabrics being generally known under the name of "Axminster carpets."

The first part of my said invention relates to an improvement in the manner of mounting the warps in the loom, and in the operation of the harness, whereby I am enabled more perfectly to secure the tufts in the fabric and to make a better web or back than can be effected by the loom described in the before recited Letters Patent.

The second part of my said invention relates to an improvement in the mechanism for transferring one by one the frames which carry the spools on which the tufting-yarns are wound of the various colors required for each range of tufts in the design or figure to be woven.

In the loom described in the said recited Letters Patent there is a series of spools equal in number to the number of ranges of tufts required for a complete design, each spool having wound upon it, and in sections, the variety of colored yarns required for one range of tufts, and the journals of each spool are mounted and turn in a separate frame, and the whole series of spool-frames are mounted in and carried by two endless chains, so operated as in succession to bring one of the said spool-frames to the required position, where it is taken by the mechanism detached from the chains and let down to within a short distance above that part of the warps where a range of tufts is to be introduced.

This part of the present invention relates to an improved mechanism for taking the spool-frames from the chains, depressing them to the position required, and after a range of tufts has been introduced in the warps and cut off, returning the spool-frames to the chains.

The third part of my said invention relates to an improvement which I denominate the "combing operation." The functions of this mechanism are to hold the warps properly apart during the operation of inserting the tufting-yarns, and after they have been cut off, and to rise through the tufts and comb them out, and thereby prevent them from becoming tangled.

The fourth part of my said invention relates to an improvement in the mechanism for cutting off the tufts from the yarns on the spools, by which that operation is rendered more perfect and the mechanism simplified; and the last part of my said invention relates to an improvement by which I am enabled to prevent the chafing of the warps experienced in the use of the loom described in the before-recited Letters Patent. In the loom so patented the range of tufts, after being inserted and cut off, is forced home or beat up to the required place in the fabric by a plate connected with the lay, and which for this purpose rides on the warps. It was found in practice that this chafes and injures the warps; and this part of my invention consists in combining with such beating-up plate a mechanism by which it is lifted up after beating up the range of tufts, and by which it is held up clear of the warps during the after operations of the lay in beating up the weft-threads to weave the web.

In the accompanying drawings, $a$ represents a suitable frame for the purpose, and $b$, $c$, and $d$, three warp-beams, which are to be provided with suitable means for making tension and letting off the warps; and from the three beams there are three sets of warps, $b'$ $c'$ $d'$ one for each beam. The warp $b'$, I denominate the "tufting-warp," because it secures and holds the tufts in the fabric. This tufting-warp is divided into two parts in passing through the harness. One third passes through one leaf, $e$, of the harness, and the other two thirds pass through another leaf, $f$, and the division of this warp into two parts, of one-third and two-thirds, is distributed equally across the loom, an 1 so that there shall be for each tuft two threads of the two-thirds' part, and one thread of the other part. Of this division I denominate the two-thirds the "inner tufting-warps," because in the woven fabric they lie inside of the tufts, and the one-third I denominate the "under tufting-warps," because they pass under the tufts. The warps $c'$ and $d'$ form the web or back of the fabric, there being as many threads in the warp $d'$ as in the whole of the tufting-warp and one-third less in the warp $c'$, so that for each tuft across the width of the fabric there will be three threads of the warp $d'$ and two of the warp $c'$. I prefer to have the threads of the two warps $b'$ and $d'$ of about equal thickness and the warp $c'$ about three times the size of the others. In the woven fabric there will between every two longitudinal ranges of tufts two threads of the large warp $c'$ and three of the small warp $d'$ and two of each at each selvage. The large warp $c'$ passes through the same leaf, $e$, of the harness as the under tufting-warp, $b'$, and the warp $d'$ passes through a third warp, $g$, of the harness, but three leaves of harness being required in the loom. All the warps pass to the cloth-beam $h$ in front, which is to be provided with a suitable take-up motion. It is important that the tension on the warps should be different. The tension should be greatest on the large warp $c'$, as the object is to have it nearly straight in the woven fabric. It should be least on the small warp $d'$, that it may be caused to lap around the weft-threads as much as possible; and on the tufting-warp $b'$ there should be about a medium tension, not so great as to prevent the threads from lapping around the tufting-yarn and yet sufficient to grip and hold the tufts firmly in the fabric.

In the operation of weaving, and preparatory to introducing the tufting-yarn, the leaf $f$ of the harness is raised and the other two depressed. In this condition all the warps are depressed, with the exception of the inner tufting-warp, $b'$, which is elevated. The tufting-yarn is then introduced between these elevated warps by the series of pinchers $i$, operated as described in the before-recited patent, and not necessary to be now described, as it makes no part of my present invention. Each mesh of tufting-yarn is carried down between the warps, moved laterally under two of the said warp-threads and then up again between the warps, thus inclosing two of the said warp-threads, within each loop that is to form one tuft. The leaf $e$ of the harness is then lifted, which brings up the under part of the tufting-warp $b'$ and the large warp $c'$, each thread of the under tufting-warp under one tuft, and opposite the space between the two warp-threads inside the tuft, and two of the large warp-threads $c'$ in each space between two tufts and two outside to form the selvages. At this time the tufts are sheared off by operations to be presently described. In the condition last named a weft-thread is thrown across. The lay then moves forward to beat up the weft-thread and range of tufts, and as the lay is advancing to make this beat the leaf $e$ of the harness begins to descend with the outer part of the tufting-warp $b'$ and with the large warps $c'$, and at the same time the leaf $g$ of the harness is elevated with the warps $d'$, all these warps being in the same plane at or about the time of the completion of this beat of the lay; and as the lay moves back the leaf $g$ carries up the warps $d'$, and the leaf $f$ and the leaf $e$ carry down their warps to open the shed to receive a second weft-thread, which is then beat up, and then the shed is opened by depressing the leaf $g$ and elevating the leaf $e$, the leaf $f$ remaining down to receive a third weft-thread, which is thus passed under the warps $c'$ and the outer part of the tufting-warp $b'$ and over the inner part of the tufting-warp $b'$ and the warp $d'$, and after this third weft-thread has been beaten up the leaf $f$ is elevated and the other two depressed to restore the warps to the same relative positions they occupied in the beginning and preparatory to receiving another range of tufts.

The mechanism giving the harness motions above described is fully represented in the accompanying drawings. The three leaves $e$ $f$ $g$ are suspended between two sets of levers, $j$ and $k$, one set above and the other below, and each set consisting of three levers vibrating on their fulcra. The outer ends of the upper and lower levers are connected by rods $l$ $l$ $l$, which are slotted, as at $m$, to receive the ends of three cam-levers, $n$ $n$ $n$, provided each with a roller, $o$, fitted to work in the cam-groove $p$ of a cam-wheel. The three cam-wheels are on the same shaft, $q$, and turn together. They are all different in form, the one, $r$, to operate the leaf $e$, the one, $r'$, to operate the leaf $f$, and the third, $r''$, to operate the leaf $g$. They are separately represented, that the form required for giving the motions and periods of rest above described may be clearly seen, and the position of the cam-roller on each will indicate the relative positions which they occupy on the shaft.

In the mechanism for transferring the spool-frames the spools $s$ and their frames $t$ are constructed and arranged as in the before recited patent, but at the lower end of the two chains, where they pass around two wheels, $u$, there are two curved plates, $u'$ $u'$, within which the ends $v$ of the spool-frames pass as they are carried down by the revolution of the chains. The spool-frames are held in the links of the chain by a catch-spring, $w$, at each end, in the manner represented in Fig. 15, but on coming down to the wheels $u$ $u$ these spring-catches are pushed in to liberate the frame from the chains by coming in contact with the faces of the wheels, and then the ends $v$ $v$ of the spool frames, thus liberated from the chains, hang on the inner surface of the curved plates $u'$ $u'$, although they continue to be moved along by the chain until they reach an opening, $x$, in each plate, made of sufficient size to permit the said projections to pass out. At this moment the chains are stopped, as described in the before recited patent. The spool-frame, on reaching the position last named, is, however, prevented from dropping out by two curved supports, $y$ $y$, on the ends of two springs attached by their rear ends to two arms, $z$ $z$, on a rock-shaft, $a'$, to be presently described. While the parts are in these positions the lower ends, $b^2$ $b^2$, of the spool-frame are taken hold of by the inner end of two vibrating levers, $c^2$ $c^2$, that have their fulcra on the end of the arms $z$ $z$ of the rock-shaft $a'$, the said levers for the purpose being provided each with an inner lip, $d^2$, to pass under the ends, and two projections, $e^2$ $e^2$, which pass each side of the ends of the spool-frame for the purpose of holding it, the said lips and projections being slightly beveled to prevent catching against the ends of the frame when moving in to take hold of it, which taking hold operation is effected by the vibration of the two levers $c^2$ $c^2$, so soon as the chains have brought the spool to the required position. The better to grip and hold the spool-frame, one of the said side projections, $e^2$, is hinged and acted on by a spring to make it grip the spool-frames, as represented in Fig. 13. The vibration of the two levers $c^2$ $c^2$ in opposite directions, for taking hold of and afterward liberating the spool-frames, is effected by connecting their opposite ends by means of connecting-rods $f^2$ $f^2$ with the opposite ends of a short intermediate lever, $g'$, pivoted to the surface of the rock-shaft $a'$. One of the said connecting-rods $f^2$ extends out beyond its lever $c^2$, and is provided with a fork, $h'$, which embraces one of two collars on the end of a rod, $i'$, adapted to slide inside of the rock-shaft $a'$, the other of the said collars embracing the end of an arm, $j'$, on a short rock-shaft, $k'$, provided with another arm, $l'$, the outer end of which is curved into a cam form, as represented. When the lay of the loom makes its last back movement, after beating up the last of the series of three weft-threads, it moves back farther than in making its series of beats, and in so moving back a piece, $m'$, on the lay strikes the convex face of the cam-like part of the arm $l'$. This gives the required rocking motion to the rocking shaft $k'$ to slide the rod $i'$, and by the connections described to vibrate the levers $c^2$ $c^2$ to make them grasp the ends of the spool-frame. This back motion of the lay is given by the part $n'$ of the lay-cam $o'$, and from $n'$ to $p'$ the said cam is concentric to give the required period of rest to the lay in this back position, while the various tufting operations take place, and from $p'$ to $q'$ it gives the first forward beating motion to beat up the tufts and the first weft-thread, and in making this first forward beat the piece $m'$ on the lay acts on the concave face of the cam-like projection of the arm $l'$ to vibrate the levers $f^2$ $f^2$ to liberate the spool-frame to deliver it to the chain, which then carries it away preparatory to bringing the next one in place for another range of tufts. The vibrating levers $c^2$ $c^2$ have, each of them a cam-like projection, $r'$ $r'$, which, as the levers are moved outward to let go the spool-frame, pass under the springs of the curved supports $y$ $y$ to force them up, and thereby lift up the spool-frame, so that its projecting ends $v$ $v$ shall be sure to enter the openings of and get fairly within the curved plates $u'$ $u'$. The spool-frame, being held by the levers $c^2$ $c^2$, is to be let down to within a short distance of the surface of the cloth that the tufting-yarns on the spool may be drawn through and around the warps by the pinchers or nippers, as fully described in the Letters Patent before recited. This letting down operation is effected in the following manner: The arm $z$ of the rock-shaft $a'$, on the left-hand side of the loom, rests on the point of an adjusting screw, $s'$, attached to a connecting rod, $t'$, connected with the vibrating end of a lever, $u''$, provided with a cam ball or roller, $v'$, which is acted upon by a cam, $w'$. The part of this cam from 1 to 2 permits the said lever $u''$ to descend and with it the levers $c^2$ $c^2$, with the spool frame. At the end of this descending motion the other arm, $z$, on the right-hand side of the loom is stopped by coming in contact with the upper end of a rod, $x'$, which slides through a bracket, $y'$, the rod being provided with an adjusting-nut, as represented, to adjust the lowest point to which the arm $z$ shall be permitted to descend. The lever $u''$ is then permitted to follow the sinuosities of the cam $w'$ without affecting the position of the levers $c^2$ $c^2$, which remain under the control of the said sliding rod $x'$. The residue of the cam $w'$ is for the shearing operation, to be presently described, until in its revolution the part from 3 to 4 comes around to lift the lever $u''$ to carry up and return the spool-frame to the chains. The moment the tufting-yarns have been sheared, and before the shears are opened, the spool-frame should be lifted slightly to clear the ends of the yarns and prevent them from being disturbed by the back movement of the shears. This is done by the sliding rod $x'$ acting under the arm $z$ on the left hand side of the loom, the said rod being connected with a lever, $y'$, which is acted upon by a pin, $z'$, on a cam-wheel, $a^3$, which gives some of the operations of the nippers, not necessary to describe, as that makes no part of my present invention. A part of the lower face of the said lever $y'$ is of a curve concentric with the circle described by the pin $z'$ to hold the spool-frame after slightly lifting, as before described. The spool-frame having been let down as before described, and the tufting-yarns passed around the warps, the manner of doing which I deem it unnecessary to describe, the yarns are to be sheared off, and for this purpose there are two blades, $b^3$ and $c^3$. The blade $b^3$ is made with a straight edge, and is attached to a stock. $d^3$, the ends of which slide in arms $e^3$ $e^3$ of a rock-shaft, $f^3$, which has its bearings in the frame and passes through the rock-shaft $a'$, before described, the latter being a sleeve-shaft; and the other blade, $c^3$, is also attached to a stock, $g^3$, the ends of which in like manner slide in the same arms as the other stock. The cutting-edge of the blade $c^3$ is formed, as represented, of four (more or less) parallel bevels, forming as many sections, each section starting at the same distance from the edge of the stock, and at the most projecting part of each section there is a point, $h^3$, to enter between the tufting-yarn, and with the upper face beveled, so that they will act to guide the cutting edge of the several sections under the cutting-edge of the blade $b^3$. These points separate the yarns at the ends of the several sections, so that all the yarns shall be sure to be acted upon by parts of the cutting-edges, which will be sure to cut them. There are corresponding points, $i^3$, on the blade $b^3$, and opposite the points on the blade $c^3$, to insure the separation of the yarns in the same places. The ways in the arms $e^3$ $e^3$ for the two stocks are slightly inclined in opposite directions, so that the cutting-edges of the two blades shall pass each other at the lowest part that the cutting-edges may get near enough to the face of the cloth without anything interfering with the face of the cloth on one side or the warp-threads on the other. The shears are let down at the same time as the spool-frame. That one of the arms $e^3$ of what may be termed the "frame" of the shears, which is on the left-hand side of the loom, has a projection from its side provided with an adjusting-screw $j^3$, which rests on the top of the connecting-rod $t'$, before described, in connection with the letting down of the spool frame, so that when the cam $w'$ permits the lever $u''$ to descend for that purpose it also permits the shears to descend, but at that time not to their lowest position, for at this time, if brought entirely down, the shears would interfere with the operation of the nippers in drawing the tufting-yarns down and around the warps; and in the descending motion just described it is important that they should not descend as much as the spool-frame, and to secure this the arm $z$, that controls the descent of the spool-frame, rests on the screw $s'$, projecting from the connecting-rod $t'$, at a less distance from the axis of vibration than is the point of support of the arm $e^3$ on the said rod, and hence the descending motion of the said rod $t'$ will impart a greater range of motion to the spool-frame than it will to the frame of the shears.

During the operation of the nippers the frame of the shears is retained in the position described by the concentric part of the cam $w'$, from 2 to 5, but after that the shears are let down to their lowest position, which is permitted by that part of the cam from 5 to 6, the arm $e^3$ of the frame of the shears being let down until it rests on the point of an adjusting-screw, $k^3$, while the next section of the cam, from 6 to 7, and which is a grooved cam for the purpose, draws down the lever $u''$ to slide the shears to cut off the tufts. To do this the upper end of the connecting-rod $t'$ is connected to one arm, $l^3$, of a rocker, $m^3$, which has another arm, $n^3$, connected by a rod, $o^3$, the opposite end of which is connected with an arm, $p^3$, of a rock shaft, $q^3$, the bearings of which are in the stock $d^3$ of the blade $b^3$, and this rock-shaft has two other arms, $r^3$ $r^3$, one at each end, which are connected by links $s^3$ $s^3$ with the stock $g^3$ of the blade $c^3$. The stock $g^3$ is provided with temper-screws, as at $t^3$, to make the friction in its ways greater than that of the stock of the blade $b^3$ in its ways, so that in the beginning of the motions last described the blade $b^3$ will be pushed forward to the full extent of its range of motion, which brings its cutting-edge up against the tufting yarns, and then the rock-shaft $q^3$ becomes the axis of motion, so that the blade $c^3$ will be drawn by the arms $r^3$ up against the opposite side of the tufting-yarns, shearing them off, and immediately the motions are reversed to carry the two blades back to their original positions. The shearing mechanism and the spool frame are then lifted up preparatory to another operation. As the lay moves back at the end of the series of beats for the three picks, a plate, $u^3$, is moved back and down onto the tufting-warps, passing over the pile already woven without touching it. In the patent before recited there is such a plate and for the same purpose—viz., holding down the tufting-warps during the operation of forming the tufts—and in the said patent this plate was provided with teeth extending between the tufting-warps to hold them laterally; but in the present instance the said plate is without teeth, as one of my present improvements relates to the introduction of a combing mechanism which combs the tufts after they have been inserted and cut off, and the comb thus introduced is employed to hold the tufting-warps apart during the tufting operation, and before they perform the combing operation. The said holding-down plate $u^3$ is pivoted at each end to an arm, $v^3 v^3$ of a rock-shaft, $w^3$, which has its bearings in the frame, and that one of the arms $v^3$ which is on the right-hand side of the loom is connected by a joint-link, $x^3$, with a lever, $y^3$, provided with a spring, $z^3$, the tension of which tends constantly to draw the plate back toward the lay and to keep the cam-ball of the lever $y^3$ against a cam, $a^4$, on the cam-shaft $q$. The concentric part of this cam, from 1 to 2, holds the plate out of the way at its farthest position, from the lay, as represented in Fig. 7, and the part from 2 to 3 moves it toward the lay, as the lay makes its last back movement, bringing it to the position represented in Fig. 6, at which the nippers $i$ begin to rise between the tufting-warps to take hold of the tufting-yarns, and the concentric part of the said cam, from 3 to 4, holds the plate in the position last named until after the nippers have drawn the tufting-yarns down and carried them under the warps, and while the said nippers carry the ends of the tufting-yarns up between the warps, that part of the said cam from 4 to 5 moves the said plate farther toward the tufts, so that its bearing-edge shall be as near to the tufts as the nippers will permit. The said last position of the plate is represented in Fig. 4. After the tufting operation is completed, the plate is pushed back by the plate in front of the reed for driving home the range of tufts, and while performing that operation, as will be presently described. So far the back-and-forth movements only of the said plate have been described. The weight of the back of the said plate has the preponderance, and at the ends near the back it is provided with two pins, $b^4 b^4$, which rest and slide on two permanent ways, $c^4 c^4$, the form of which, as represented, will cause the plate to move up and down and vibrate on its axis of connection with the arms $v^3 v^3$, as required to perform the duties described. On top of the plate $u^3$ and at the ends it is formed with projections $d^4 d^4$, with slots in them to receive journals on the ends of the comb-plate $e^4$, the said journals being about in a line with the back of the comb-teeth, and so adapted that they can slide in the said slots. The comb-teeth I prefer making by cutting into the edge of the plate, and the said teeth are curved, as represented. The back of this comb-plate at both ends is connected by suitable wrist-pins and links $f^4 f^4$ with the arms $g^4 g^4$ of a rock-shaft, $h^4$, the journals of which are mounted in the arms $v^3 v^3$ of the rock-shaft $w^3$, so that the rock-shaft $h^4$ moves with the arms $v^3 v^3$. The mechanism so far described would cause the comb-plate to have just the same movements as the plate $w^3$; but as the plate $u^3$ makes its first-described movement toward the place where the range of tufts is to be formed, it is necessary that the back edge of the comb-plate should be elevated to depress the teeth, that they may enter between the tufting-warps to hold them apart. This is effected by a hook, $i^4$, which, at the time the shaft $h^4$ is moved with the arms $v^3 v^3$, holds onto the pin on a short arm, $j^4$, extending down from it, that its upper arms, $g^4 g^4$, may move faster, and thereby lift the back of the comb-plate and carrying the teeth down between the warps, as represented in Fig. 6. The teeth remain there until the nippers carry up the ends of the tufting-yarns between the warps, and as they rise the back of the comb-plate is depressed to bring the comb-teeth to the position represented in Fig. 6. To do this the hook $i^4$ must be first disengaged from the arm $j^4$ of the rock-shaft $h^4$, which is effected by a rod, $k^4$, which lifts it off from the pin at the required time. This rod is connected with and lifted by the lever $l^4$, which lifts the nippers $i$ by the cam $m^4$, the said lever $l^4$ being connected with the arm $n^4$ of the nippers by the link $o^4$, as represented, and so soon as the hook is disengaged the plate $u^3$ begins its last movement toward the tufts, as before described. One of the arms $g^4$ is held back by a pin, $p^4$, on a fixed bracket, $q^4$. This draws down the back of the comb-plate, causing the teeth to rise between the lower part of the tufts to the position represented in Fig. 4. As the hook $i^4$ is disengaged from the arm $j^4$ of the comb-motion, and this rod receives its motion from the lever which lifts the nippers, and in the operation the nippers have two up and down motions, one to take hold of and draw down the tufting-yarns and the other to carry them up, and in the former they are lifted higher than in the latter, and it is during the latter that the hook $i^4$ of the comb is required to be disengaged. It is necessary to understand why the rod $k^4$ does not lift the hook $i^4$ during the first upward motion of the nippers. The nippers, after drawing down the tufting-warps, receive a lateral movement to carry the yarns under the warp-threads, as fully described in the patent herein recited. To do this a rock-shaft, $r^4$, is made to slide endwise to the required distance. The rod $k^4$ slides in a lug, $s^4$, on the said shaft $r^4$, so that when the shaft slides to give the lateral movement to the nippers, it carries the the rod $k^4$ in line to unhook the hook $i^4$, when the nippers make their second upward movement.

It now remains to specify in what manner the combs and the plate $u^3$ receive their last motion to the position represented in Fig. 7, and out of the way. As the lay makes its first forward beat, a plate, $t^4$, on the lay and in front of the reed is brought up against the range of tufts to force them up to the required place in the fabric, and in this forward movement the face of the plate $t^4$ grips the range of tufts up against the edge of the plate $u^3$, and, in pushing the range of tufts home, pushes the plate $u^3$ and the comb back at the same time, the comb-teeth still remaining between the tufts, and at the bottom thereof. The force with which the tufts are gripped against the edge of the plate $u^3$ is such that the weight of its back edge is not sufficient to lift its forward edge, but the moment it is relieved from this pressure by the back movement of the lay the weight of the back preponderates, lifting the front edge, and with it the combs, which pass up between the tufts to perform the last of their combing operation. This lifting motion of the comb-teeth is arrested by the pins $b^4 b^4$ of the plate $u^3$ coming down onto the highest portion of the ways $c^4 c^4$. The lower edge of the beating-up plate $t^4$, as before stated, is described in the patent herein recited as resting and riding on the warps during all the beats of the lay. It is only necessary that it should touch or nearly touch the warps when it approaches the range of tufts during the first beat of the lay, that it may be effectual in driving home the range of tufts, but at all other times it is important that it should not touch the warps. This plate $t^4$ is placed so as to slide against the front face of the reed, and the mode of construction adapted and represented is to take two plates, one in front and the other behind the reed, and unite the ends beyond the ends of the reed. The ends are connected by wrists or journals, and two links, $u^4 u^4$, with two arms of a rock-shaft, $v^4$, provided with a coil-spring, $w^4$, which tends constantly to hold the plate up against the top-bar of the reed; but at the time of the first forward beat of the lay it is drawn down by a cam, $x^4$, acting on an arm, $y^4$, of the said rock-shaft, so that its lower edge shall rest on or close to the warps. When the shearing mechanism is depressed prior to the tufting operation, the weight of the shearing mechanism is availed of to increase the tension on the tufting-warps, which are required to be under greater tension at that time than during the weaving-in operations. This is accomplished by an arm, $z^4$, on the rock-shaft $f^3$, which, by the descent of the frame in which the shears work, is moved back and acts by a dog on the teeth of a rod, $a^5$, which, by the interposition of a spring, $b^5$, acts on an arm, $c^5$, of the rock-shaft $d^5$ to elevate the whip-roll $e^5$ of the tufting-warps $b'$, as represented.

On inspection of the drawings it will be seen that all the cams for producing the several motions required are arranged on one shaft instead of two, as described in the patent herein recited.

The connection of the several improvements constituting my present invention is represented in the accompanying drawings in connection with the invention described in the before-recited patent, and, in so far as it was necessary to modify the form and arrangement of the old parts to connect the improvements with the said prior invention, such modifications are fully represented in the accompanying drawings.

What I claim as my invention, and desire to secure by Letters Patent, is—

1. The manner of mounting and operating the several warps relatively to each other and to the introduction of the tufts and the series of wefts, substantially as described, and for the purposes set forth.

2. The improved arrangement herein described for transferring the spool-frames which carry the tufting yarns, as distinguished from the arrangement described in the before-recited patent for effecting the transfer.

3. The mechanism herein described for performing the combing operation on the tufts.

4. The said combing mechanism, in combination with the mechanism for holding the tufting-warps in the same plane during the tufting operation, as described.

5. The mechanism, substantially as herein described, for cutting off the tufts by means of a single pair of shears, as distinguished from a pair of shears for each tuft, as described in the before-recited Letters Patent.

6. The manner in which the plate which beats up the tufts is prevented from chafing the warp-threads, substantially as described.

HALCYON SKINNER.

Witnesses:
WM. H. BISHOP,
A. DE LACY.